Figure 1:
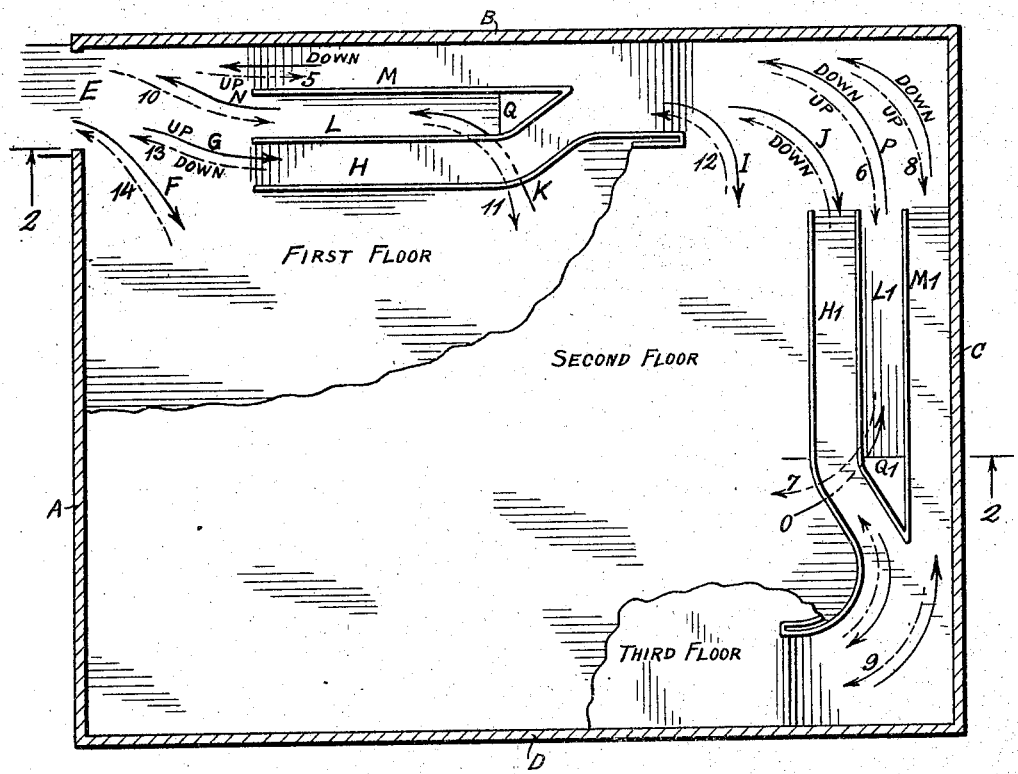

July 5, 1927.  1,634,498

R. C. HECOX

AUTOMOBILE HOTEL AND GARAGE

Filed May 15, 1926

Inventor

Roy C. Hecox

By A. J. O'Brien

Attorney

Patented July 5, 1927.  1,634,498

UNITED STATES PATENT OFFICE.

ROY C. HECOX, OF DENVER, COLORADO.

AUTOMOBILE HOTEL AND GARAGE.

Application filed May 15, 1926. Serial No. 109,279.

This invention relates to improvements in the construction of automobile hotels or garages or storage buildings.

The great number of automobiles in our cities makes it necessary to provide strict parking restrictions with respect to the time that an automobile may remain parked in any one place. This limits very greatly the usefulness of the automobile and makes it necessary to provide parking spaces where they may remain parked as long as desired. It is now quite common to utilize vacant lots for all day parking, but obviously this is not very satisfactory for it leaves the automobiles exposed to the action of the sun and rains and in winter to the cold.

It has been proposed to build garages several stories in height for the purpose of providing storage spaces for automobiles. Such garages or automobile hotels are provided with elevators for hoisting the automobiles or with inclined roadways or ramps along which an automobile may go by its own power from a lower to a higher floor or downwardly in the opposite direction. Such ramps or inclines are often made of sufficient width to permit two cars to pass thereon. As it is necessary to turn off from the inclined roadway or ramp at the floor on which the car is to stop, there must be means provided to facilitate this. Where these inclines are usually quite steep, the cars must be put into low gear in going up and down and usually the car going up must do so under full power which makes it essential that it must not be required to stop between floors. It is also necessary for cars that are to leave to get onto the downward ramp and unless a special construction is resorted to this can only be accomplished by the down going cars crossing the path of either the cars that are going up to a higher floor or cutting directly onto the path of the cars which are coming down from the floors above, which is highly objectionable.

It is the object of this invention to produce a ramp construction that will make it possible for upgoing cars to turn off at any desired floor with no interference with down-going cars and for down-going cars to go from the floor onto the down ramp with no interference with up-going cars and onto the down ramp with the least possible interference with the down-going cars.

The above object is attained by the very simple expedient of separating the double width ramp or roadway into two parallel portions for a short distance above each floor so as to provide a passageway under one of the ramps and between the two portions of sufficient width to permit an automobile to pass between them.

Figure 2:
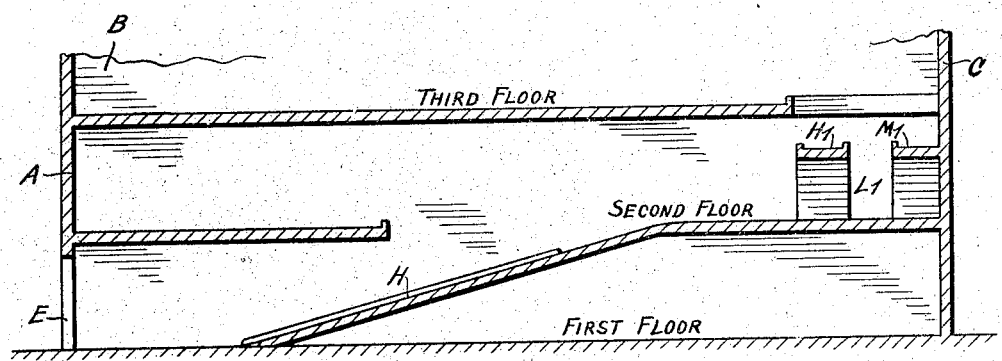

In order more clearly to describe my invention, I shall have reference to the accompanying drawing in which the preferred embodiment thereof has been illustrated and in which:

Fig. 1 is a plan view of a building with portions of the floor broken away so as to more clearly disclose the arrangement of the ramps; and Fig. 2 is a section taken on line 2—2, Fig. 1.

I have illustrated my invention in connection with a building having three floors as the arrangement is the same for any number of floors.

Let us consider that the building has the shape of a rectangle or square with four walls A, B, C and D and that the entrance portal E is located in wall A near wall B. Any cars that are to be parked on the first floor follow the arrow marked F, while cars that are going to a floor above follow the arrow G and pass upwardly along the inclined roadway H to the second floor where they may turn off along the path indicated by the arrow I, or if they are to go to the third floor, they may proceed along the path indicated by arrow J and onto the incline $H^1$. Any car on the first floor may leave by passing underneath the incline H in the manner indicated by the arrow K into the opening L between the ramps H and M and thence out through the portal E along the path indicated by the arrow N. Cars leaving the second floor will pass beneath the ramp $H^1$ along the path indicated by the arrow O and through the space $L^1$ between the ramps $H^1$ and $M^1$ and thence along the path indicated by arrow P. It can be readily seen that the down cars do not in any way interfere with the up-going cars which may therefore proceed at as great speed as necessary, and that they interfere with other down-going cars to the least extent possible, by simply cutting in ahead of or behind them when safe and convenient so to do from the level of any floor.

I also desire to call attention to the fact that the openings L, $L^1$ etc. only extend a sufficient distance to reach a height that will permit the cars to pass underneath the transverse wall Q and that above this point the ramp is single and of a sufficient width to permit two cars to pass which conserves space, thereby leaving more floor space than if double ramps were extended from one floor to the other.

It is evident that the directions of the traffic indicated by full line arrows and just described may be reversed in the manner indicated by dotted arrows. The cars may proceed upwardly on the ramp M in the manner indicated by arrow 5 and enter the second floor parking space along the path indicated by arrows 6 and 7 and if it is to proceed to the third floor, it will follow arrows 8 and 9. If the car is to be parked on the first floor, it follows arrows 10 and 11. Down cars from floor 2 follow arrows 12 and 13 and cars leaving the first floor pass out along the path indicated by arrow 14. In either of the above cases there is no interference between the incoming and outgoing cars which is a matter of utmost importance and this is accomplished by the simple expedient of constructing the ramps with an opening of sufficient size to permit automobiles to pass underneath one of the ramps at the nearest point where they can get clearance on any floor and then to pass between the up and down roadways.

From the above it will be apparent that I have devised a method whereby in any multiple story garage or storage building using double width ramps, wheresoever located in the building, the up-going cars can proceed from the street to any floor without crossing the pathway of any down-going car and the down-going cars can proceed from any floor to the street without crossing the pathway of any up-going car and any down-going car can proceed onto the down ramp with the least possible interference with other down-going cars.

Having now described my invention what I claim as new is:

1. In a multiple storage garage having inclined roadways whereby automobiles may pass by their own power up to or down from any floor, each roadway where it leaves any floor being divided longitudinally and its two parts transversely spaced a sufficient distance to permit an automobile to pass between them, the structure being provided with an opening underneath one at least of the spaced inclined roadway parts to allow an automobile on that floor to reach the said space between the two parts of the roadway or to pass from said space to the open floor space, as may be required.

2. An inclined roadway for permitting automobiles to pass from one floor of a multiple floor garage to another by their own power, said roadway having its lower end formed of two separate parts spaced a sufficient distance to permit a car to pass between them and having its upper end formed as a single roadway of sufficient width to permit two cars to pass each other, the structure being provided with an opening underneath one at least of the two parts of the inclined roadway, for the passage of automobiles.

3. An inclined roadway extending from one floor of a multiple floor garage to another floor, said roadway having its lower end longitudinally divided so as to form a space through which an automobile may pass, the structure being provided with an opening underneath one of said roadway parts to permit an automobile to pass in leaving or entering upon any floor.

4. An inclined roadway or ramp adapted to extend from one floor to another of a multiple floor garage, said roadway having its upper portion of sufficient width to permit two cars to pass and having its lower end separated into two parallel portions, each of sufficient width to accommodate one car, said parts being separated so as to form an opening of sufficient size to permit an automobile to pass, the structure being provided with an opening underneath one of the said roadway parts, said opening connecting the space between the roadway parts and the parking space of the floor.

5. In a multiple story garage having inclined roadways from one floor to the other whereon automobiles may go by their own power up from a lower level to a higher or in the reverse direction, means for permitting a car to travel from the street level to any floor without crossing the pathway of any car going down and for permitting the down-going cars to proceed from any floor to the street without crossing the path of any up-going car, said means comprising roadways having a portion thereof directly above a floor level separated into two parts so as to provide a space through which a car may pass, the structure being provided with an opening under one of said parts, said opening connecting the said space with the parking area of the floor.

In testimony whereof I affix my signature.

ROY C. HECOX.